United States Patent [19]

Lin

[11] Patent Number: 5,391,703
[45] Date of Patent: Feb. 21, 1995

[54] POLYAMIDE PIGMENT DISPERSION

[75] Inventor: Perry H. Lin, Seaford, Del.

[73] Assignee: E. I. Du Pont de Nemours and Company, Wilmington, Del.

[21] Appl. No.: 50,419

[22] PCT Filed: Nov. 18, 1991

[86] PCT No.: PCT/US91/08387

§ 371 Date: May 19, 1993

§ 102(e) Date: May 19, 1993

[87] PCT Pub. No.: WO92/08829

PCT Pub. Date: May 29, 1992

Related U.S. Application Data

[63] Continuation-in-part of Ser. No. 616,126, Nov. 20, 1990, Pat. No. 5,223,196.

[51] Int. Cl.$^6$ ............................................. C08G 69/26
[52] U.S. Cl. ..................................... 528/339; 528/347; 524/606; 264/78; 264/210.8; 264/211
[58] Field of Search ............... 528/339, 347; 524/606; 264/78, 210.8, 211

[56] References Cited

U.S. PATENT DOCUMENTS

| | | | |
|---|---|---|---|
| 2,252,554 | 8/1941 | Carothers | 528/338 |
| 3,382,216 | 5/1968 | Blaschke et al. | 528/339 |
| 3,542,743 | 11/1970 | Flamand | 528/335 |
| 3,565,910 | 2/1971 | Elbert et al. | 524/88 |
| 3,583,949 | 6/1971 | Simons | 528/324 |
| 3,621,089 | 11/1971 | Edgar et al. | 264/211 |
| 3,629,053 | 12/1971 | Kimura et al. | 528/339 |
| 3,640,942 | 2/1972 | Crampsey | 524/338 |
| 3,696,074 | 10/1972 | Tsuda et al. | 528/338 |
| 3,787,373 | 1/1974 | Ridgway et al. | 528/324 |
| 3,824,207 | 7/1974 | Carter et al. | 523/347 |
| 3,846,507 | 11/1974 | Thomm et al. | 528/337 |
| 3,926,924 | 12/1975 | Edgar et al. | 528/324 |
| 4,218,509 | 8/1980 | Edgar et al. | 528/339 |
| 4,579,762 | 4/1986 | Ucci | 428/95 |
| 5,223,196 | 6/1993 | Shridharani et al. | 528/339 |

FOREIGN PATENT DOCUMENTS

| | | |
|---|---|---|
| 0035051 | 9/1981 | European Pat. Off. . |
| 193023 | 9/1986 | European Pat. Off. . |
| 0373655 | 6/1990 | European Pat. Off. . |
| 61-63785 | 4/1986 | Japan . |
| 145415 | 6/1988 | Japan . |
| 918637 | 2/1963 | United Kingdom . |
| 1249730 | 10/1971 | United Kingdom . |
| 1526329 | 9/1978 | United Kingdom . |

Primary Examiner—John Kight, III
Assistant Examiner—P. Hampton-Hightower

[57] ABSTRACT

An improved process for preparing pigmented drawn polyamide fibers is disclosed, the improvement being the improved processability obtained from the use as a carrier polymer for the pigment dispersion of a random copolymer of hexamethlyene diamine, isophthaiic acid and terephthalic acid.

4 Claims, 1 Drawing Sheet

POLYAMIDE PIGMENT DISPERSION

The present invention is a continuation-in-part of application Ser. No. 07/616,126, filed Nov. 20, 1990, now U.S. Pat. No. 5,223,196.

FIELD OF THE INVENTION

This invention relates to an improved process for making pigmented polyamide yarns involving, as the polymer matrix for a pigment dispersion, random copolymers of hexamethylene diamine, isopththalic acid and terephthalic acid.

BACKGROUND OF THE INVENTION

Nylon yarns and products made therefrom, such as fabrics and carpeting, have long been colored by treatment with acid, cationic, or other types of dyes. Recently, yarn producers have begun incorporating colored pigments into nylon yarns to improve their resistance to degrading and fading in ultraviolet light, to provide improved resistance to chemicals and noxious fumes, and to provide permanent coloration which is not removed by washing. While some pigments can be mixed easily into the nylon without adversely affecting the filament spinning operation, most pigments—and particularly organics—cause some difficulties while being mixed into the nylon or in subsequent melt-spinning and drawing operations. In general, organic pigments cross-link nylon, change its viscosity, increase the rate of crystallization and spherulite formation resulting in increased draw tension, weakened fibers, and more filament breaks.

European Patent Publication No. 0373655 ("Anton et al."), published Jun. 20, 1990, discloses processes for making stain-resistant, pigmented-colored polyamide fibers with acceptable levels of spinning performance. Those processes involve forming a random nylon copolymer made with up to 4.0 weight percent of a cationic dye additive such as 5-sulfoisophthalic acid or its salts, adding a pigment dispersed in a matrix of nylon 6 and a nylon 6,6/6,10/6 multipolymer to the random copolymer, and melt-spinning the pigment/polymer blend.

The pigment dispersions used in making such fibers are typically prepared by first combining the raw pigment with the nylon multipolymer in roughly equal percentages by weight, melting and resolidifying the combination to form pigmented pellets of the multipolymer. These pellets are then remelted or "letdown" in an equal or greater amount of nylon 6, mixed thoroughly to form a uniform dispersion, resolidified, and pelletized. Certain pigments, however, remain very difficult to spin and draw when dispersed in such matrices.

Ways of reducing the impact of such pigments on nylon spinning and drawing performance would permit the use of a wider selection of colored pigments, both organic and inorganic, and would enable fiber producers to offer a complete range of styling colors without encountering serious product deficiencies or operating difficulties.

SUMMARY OF THE INVENTION

In one embodiment the present invention provides an improved process for preparing pigmented drawn polyamide filaments wherein a molten mixture of a polyamide and a pigment dispersed in a polymer matrix is spun into filaments and drawn, the improvement being the use of a polymer matrix which is a random copolymer of hexamethylene diamine, isophthalic acid and terephthalic acid. Such random copolymers will sometimes be referred to herein as 6I/6T polymers or copolymers, 6I referring to the units formed by the reaction of hexamethylene diamine and isophthalic acid, and 6T referring to the units formed by the reaction of the diamine with terephthalic acid.

The pigment dispersions or compositions of this invention are comprised of from about 5–25% by weight of pigment dispersed in a polymeric carrier or matrix of from about 75–95 weight percent of the 6I/6T copolymer. Preferably the molar ratio of the isophthalic units to the terephthalic acid units in the copolymer is from about 60:40 to about 80:20. Most preferably, this ratio is about 70:30. The compositions may also optionally include small quantities of lubricants and surfactants conventionally used as dispersion aids in pigment concentrates.

The use of these pigment compositions results in reduced draw tension necessary to achieve a predetermined degree of draw in the pigmented fiber. Additional benefits include uniform dispersion of the pigment within the polymer matrix and simplified preparation of the concentrate itself.

DETAILED DESCRIPTION OF THE INVENTION

Figure 1:
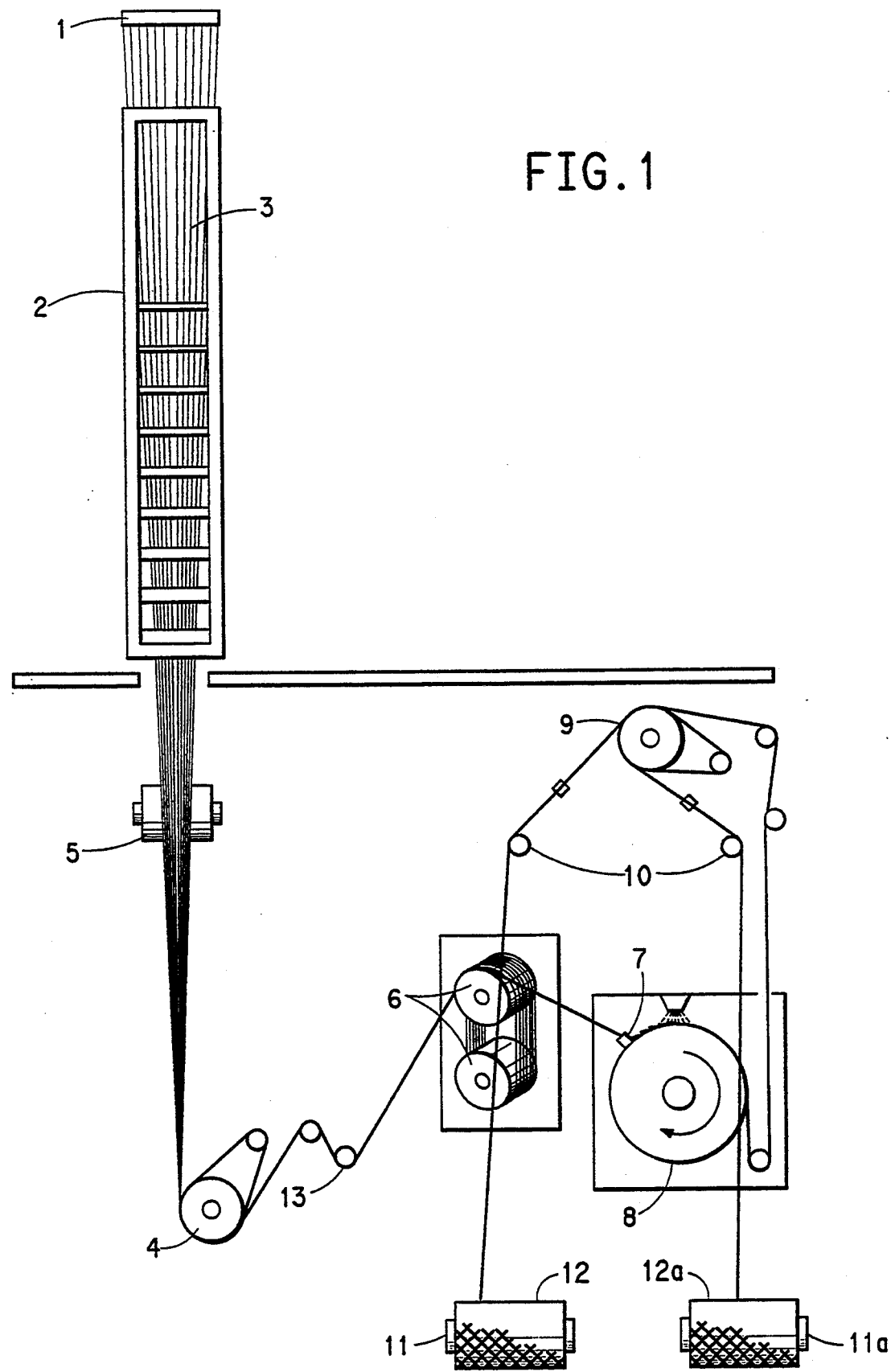
FIG. 1 is a schematic depiction of a spin-draw process used of this invention.

The carrier or matrix 6I/6T polymer used in making the pigment concentrates of this invention is a random condensation product of isophthalic acid, terephthalic acid, and hexamethlyene diamine. Such condensation polymers can be made by conventional autoclave polymerization of aqueous salt solutions of the various monomers. The molar ratio of the two acids is preferably between 60:40 and 80:20, the isophthalic acid units being present in greater proportion in order to avoid undesirable melt flow behavior. If the amount of isophthalic acid is increased significantly beyond this range, the melt viscosity of the copolymer will be too low and it will be difficult to pelletize the concentrate. Conversely, if the amount of terephthalic acid is increased beyond this range, the melt viscosity will be raised to the point where it is difficult to achieve good dispersion and extrude the concentrate into pellets. In a particularly preferred copolymer the molar ratio of the isopthalic acid units to those of terephthalic acid is about 70:30. The molecular weight of the carrier polymer should not be so low as to make it difficult to form pellets; nor should the molecular weight be allowed to reach levels where the melt viscosity of the polymer is too high to ensure uniform dispersion. Number average molecular weights in the range of 8900 have been found to perform particularly well.

While the isophthalic acid and terephthalic acid monomers are most preferred, it is expected that phthalic acid and the derivatives of any of these diacids, such as methyl, chloro-, and bromo-, will also give comparable results.

The pigment concentrates of this invention can be prepared by combining from 5–25% by weight dry pigment with from 75–95 weight percent of the matrix polymer, heating the two to a temperature above the melting point of the polymer in a co-rotating twin-screw type extruder for sufficient time to ensure thorough and uniform dispersion of the pigment, and extruding and pelletizing the resulting mixture. Conventional amounts of lubricants and surfactants commonly used as dispersion aids can also be added to ensure even greater uniformity of dispersion. The full range of pigments, including both inorganic and organic types, may be used to form these pigment concentrates, although particularly effective results have been obtained with difficult to spin organic pigments, perhaps due to the compatibility of the aromatic carrier polymer with such aromatic pigments.

These random 6I/6T copolymers are amorphous in nature, melting over a broad temperature range. As such they exhibit a higher melt viscosity and greater shear so that it is easier to disperse the pigment in the carrier polymer than with the conventional carriers which are more crystalline in nature. This amorphous nature of the carrier polymer and the resulting pigment concentrate is believed to be a key factor in the improved process for spinning and drawing polyamide fibers colored with these concentrates. As will be seen from the examples described hereinafter, reducing the crystallinity of the pigment concentrate lowers the potential for crystal formation and spherulite growth in the fibers, both of which adversely impact the fiber spin/draw process.

The process for preparing colored polyamide fibers using these concentrates involves co-feeding one or more polyamides, either in pellet form following batch polymerization, or directly from a continuous polymerization process, together with the pigment concentrate to a device for melting and mixing the pigment with the polyamide(s). Typically a screw-melter is used. The homogeneous, molten blend is then carried through a transfer line to a spinneret and spun into fibers using conventional fiber manufacturing steps. The freshly spun fibers are then drawn to increase their orientation, and further processed, for example by bulking to make bulked continuous filament yarns or by crimping and cutting the fibers into staple.

These pigment concentrates are particularly useful in coloring nylon 6,6 fibers which are more crystalline than the other most common polyamide, nylon 6, and therefore tend to be more difficult to spin. Nonetheless the concentrates can be used to color both nylon 6 and other polyamides and copolyamides in addition to nylon 6,6 and copolyamides thereof. Particularly good results have been shown in coloring stain-resistant yarns of the type disclosed in the Anton et al. publication referred to earlier, where the polyamide is a nylon 6,6 copolymer containing minor amounts of a cationic dye additive such as 5-sulfoisophthalic acid.

Polyamide fibers colored with these pigment concentrates can be used in the full range of fiber end-uses, including without limitation, carpeting, upholstery, textile fabrics, and industrial applications. Polyamide resins colored with these pigment compositions can also be used in non-fiber applications, such as in the manufacture of blow-molded or injection-molded products or in the manufacture of other types of formed articles.

TEST METHODS

Relative Viscosity (RV) is the formic acid relative viscosity measured as described at col. 2, lines 42-51, in Jennings, U.S. Pat. No. 4,702,875.

Amine and Carboxyl Ends are determined by the methods described on pages 293 and 294 in Volume 17 of the "Encyclopedia of Industrial Chemical Analysis" published by John Wiley & Sons (1973).

Modification Ratio (MR) is defined and measured as in Bankar et al., U.S. Pat. No. 4,492,731.

Draw Tension is the tension on the yarn in the draw zone as it is being drawn to a predetermined degree. It is measured using a hand-held tensionometer, Model TR 2000 from Tensitron, Inc., Harvard, Mass.

Isothermal Crystallization Rates (half-times) were measured by Differential Scanning Calorimetry (DSC) using standard software. A Perkin-Elmer DSC-7 with an attached cooler was used. Fiber samples wighing approximately 7-8 mg were dried in a 100° C. vacuum oven over night and then placed into the DCS cell which was continuously purged with nitrogen at a rate of 40 ml/min. Samples were heated to 200° C. very rapidly, then heated at a controlled rate of 50° C./minute to 290° C., held for five minutes, cooled at 50° C./minute to a temperature below the sample's melting point and then held at that temperature (hereafter sometimes referred to as the "isothermal temperature") for 15-30 minutes until the crystallization was completed.

EXAMPLES

The following examples are offered for the purposes of illustrating the invention and are not intended to be limiting. Percentages are by weight except where otherwise indicated.

EXAMPLE 1 (CONTROL)

A copolymer containing 2% by weight of hexamethylene-5-sulfoisophthalamide units was prepared by blending the nylon 6,6 precursor, hexamethylenediammonium adipate salt, with a salt formed from the sodium salt of 5-sulfoisophthalic acid and hexamethylene diamine, polymerizing, and cutting the polymer into flake. The flake had amine ends in the range of 10-20 and a formic acid RV of about 36. This polymer was then further polymerized via solid phase polymerization to raise the RV to about 58. This conditioned polymer flake is supplied to a screw melter and melted by progressively raising the temperature in the screw melter to about 288° C. Phthalo Blue pigment concentrate pellets composed of 20% Phthalo Blue (PB-15:2) pigment, 0.5% dispersion aid, 29.5% of a nylon multipolymer having units of nylon 6, 6,6, and 6,10 (46/34/20 wt % respectively), and 50% nylon 6 as described in Table A below was co-fed to the screw melter at a rate of 2% based on weight of fiber and homogeneously blended into the polymer melt. The molten blend is then discharged from the screw melter into a transfer line from where it is pumped to the spinning apparatus described below. Total holding time for the molten, pigmented polymer blend is about about 3-4 minutes at 288° C.

Referring to FIG. 1, the melt was then spun at a rate of 4.1 grams/hole/minute through a 2.3 MR trilobal spinneret 1 and into a quench chimney 2 where a cooling air was blown past the hot filaments 3 at a flow rate of about 250 cubic ft./minute (7.1 cubic meters/min.). The 68 filaments in the yarn bundle were pulled from the spinneret 1 and through the quench zone by means of a puller or feed roll 4, rotating at 990 yards per minute (900 meters/minute). After quenching in air at a temperature of about 10° C., the filaments were treated with spin-draw finish material by contacting a finish applicator 5. Next, the filaments passed around feed roll 4 from where the yarn is drawn over a pair of draw pins 13 by a pair of heated (185° C.) draw rolls 6, rotating at 2624 ypm (2385 meters/min.). An insulated enclosure reduced loss of heat energy from draw rolls 6. With 7.5 wraps on rolls 6, the yarn filaments were heated and advanced for crimping by a hot air jet 7 of the type described in Breen and Lauterbach, U.S. Pat. No. 3,186,155. The bulking air temperature was 220° C. The hot fluid exhausted with the threadlines against a rotating drum 8 having a perforated surface, on which the yarns were cooled to set the crimp using a mist quench of deionized water. From the drum 8, the threadlines in bulky form passed to a driven take-up roll 9, over secondary finish applicators 10 onto rotating cores 11 and 11a to form packages 12 and 12a. The final product was a 1225 denier (1338 dtex), 18 denlet (19.7 dtex) per filament yarn. The pigment level in the drawn and bulked fibers was about 0.4% based on weight of fiber. The draw tension on the yarn, measured at a location about 1.5 inches (3.8 cm) above the second draw pin, was about 1450 grams or about 1.184 grams/denier (1.01 g/dtex). The spinning process was poor with many broken filaments.

EXAMPLE 2

This example illustrates the improvement in spinning obtained with the 6I/6T carrier polymer. Pigmented nylon fibers were made by the same method described for producing the yarn of Example 1 except that a different pigment concentrate was used. The pigment concentrate was made by mixing 20% of the same Phthalo Blue (PB-15:2) pigment, 79.5% 6I/6T copolymer (70/30 molar ratio of hexamethylene isophthalamide units to units of hexamethylene terephthalamide, the copolymer having a weight average molecular weight of 22500 and a number average molecular weight of 8960), and 0.5% of the same dispersion aid in a co-rotating twin screw extruder at about 220° C., and extruding into pellets. (See Table A.) These pigment concentrate pellets were then co-fed to the screw melter at the same 2% rate on weight of fiber as was used in Example 1. The pigment level in the drawn and bulked fibers was about 0.4% based on weight of fiber. The total carrier resin in the fiber was about 1.6%. The yarn spun noticeably better than the yarn of Example 1. The measured draw tension on the yarn was about 1200 grams or about 0.980 grams/denier (0.89 g/dtex).

EXAMPLE 3

This example illustrates further improvement in spinning can be obtained if the amount of the 6I/6T carrier polymer is increased. The same spinning process was used as in Examples 1 and 2, but a pigment concentrate having the composition of 10% Phthalo Blue (PB-15:2), 0.5% of the dispersion aid, and 89.5% of 6I/6T copolymer as shown in Table A, was used at a rate of 5% on weight of fiber. The pigment level in the drawn and bulked fibers was about 0.5%. The total carrier resin level in this example was 4.5%. The yarn spun better than both Example 1 and Example 2. The measured draw tension was about 1100 grams or 0.898 grams/denier (0.82 g/dtex).

The crystallization properties of both the pigment concentrates themselves and the fibers made in each of the examples are compared in Tables B and C. As can be observed, the 6I/6T concentrates would not crystallize at temperatures in the 198°–205° C. range, and crystallization half-times were significantly longer for the fibers of Examples 2 and 3 in the 240°–244° C. range. It is believed that these lower crystallization rates reduce the tendency for crystals and/or spherulite formation in the fiber, thereby resulting in the observed lower draw tension and improved spinning performance.

TABLE A

| Conc. | Concentrate | | | | | Fiber | | | | Draw Tension |
| --- | --- | --- | --- | --- | --- | --- | --- | --- | --- | --- |
| | Phth. Blue | 6, 6/ 6, 10/6 | N6 | 6I/6T | Disp. Aid | Phth. Blue | 6, 6/ 6, 10/6 | N6 | 6I/6T | |
| Ex. 1 | 20% | 29.5 | 50 | 0 | 0.5 | 0.4 | 0.6 | 1.0 | 0 | 1.184 |
| Ex. 2 | 20 | 0 | 0 | 79.5 | 0.5 | 0.4 | 0 | 0 | 1.6 | 0.987 |
| Ex. 3 | 10 | 0 | 0 | 89.5 | 0.5 | 0.5 | 0 | 0 | 4.5 | 0.898 |

TABLE B

| | Crystallization Half-time (min.) of Concentrate | | |
| --- | --- | --- | --- |
| | Isothermal Temperature | | |
| Item | 198° C. | 200° C. | 205° C. |
| Ex. 1 | 0.20 | 0.80 | 1.66 |
| Ex. 2 | | would not crystallize | |
| Ex. 3 | | would not crystallize | |

TABLE C

| | Crystallization Rates of Fibers Made with Different Concentrates | | |
| --- | --- | --- | --- |
| | Isothermal Temperature | | |
| Item | 240° C. | 242° C. | 244° C. |
| Ex. 1 | 0.48 | 0.74 | 1.23 |
| Ex. 2 | 0.59 | 0.84 | 1.49 |
| Ex. 3 | 0.61 | 1.02 | 1.69 |

I claim:

1. In a process for preparing pigmented drawn polyamide filaments wherein a molten mixture of a polyamide and a pigment dispersed in a polymer matrix is spun into filaments and drawn, the improvement wherein the polymer matrix is a random copolymer of hexamethylene diamine, isophthalic acid and terephthalic acid.

2. The process of claim 1 wherein the molar ratio of the isophthalic acid and terephthalic acid units present in the random copolymer is between about 60:40 and about 80:20.

3. A pigment composition comprising from about 5–25% by weight of a pigment and from about 75–95% by weight of a random copolymer of hexamethylene diamine, isophthalic acid and terephthalic acid.

4. The composition of claim 3 wherein the molar ratio of the isophthalic acid and terephthalic acid units present in the random copolymer is between about 60:40 and about 80:20.

* * * * *